(12) United States Patent
Schlipf et al.

(10) Patent No.: US 12,509,212 B2
(45) Date of Patent: Dec. 30, 2025

(54) WING FOR AN AIRCRAFT AND HIGH LIFT ASSEMBLY CONNECTION METHOD

(71) Applicant: Airbus Operations GmbH, Hamburg (DE)

(72) Inventors: Bernhard Schlipf, Hamburg (DE); Dennis Krey, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/071,237

(22) Filed: Mar. 5, 2025

(65) Prior Publication Data
US 2025/0282470 A1 Sep. 11, 2025

(30) Foreign Application Priority Data
Mar. 8, 2024 (EP) .................................... 24162379

(51) Int. Cl.
*B64C 3/16* (2006.01)
*B64C 3/44* (2006.01)

(52) U.S. Cl.
CPC . *B64C 3/44* (2013.01); *B64C 3/16* (2013.01)

(58) Field of Classification Search
CPC .... B64C 9/02; B64C 9/16; B64C 9/18; B64C 9/22; B64C 9/24
See application file for complete search history.

(56) References Cited

U.S. PATENT DOCUMENTS

| 4,470,569 A | 9/1984 | Shaffer et al. |
| 4,753,402 A | 6/1988 | Cole |
| 2022/0227476 A1* | 7/2022 | Krey .................. B64C 3/28 |

OTHER PUBLICATIONS

European Search Report for corresponding European Patent Application No. 24162379.2 dated Sep. 5, 2024.

* cited by examiner

*Primary Examiner* — Ashesh Dangol
(74) *Attorney, Agent, or Firm* — Greer, Burns & Crain, Ltd.

(57) ABSTRACT

A wing for an aircraft, a method of connecting a high lift assembly to the wing, and an aircraft including such a wing. The wing includes a main wing, a bracket and a high lift assembly. The high lift assembly includes a high lift body including a connection assembly movably connecting the high lift body to the main wing. The bracket includes a plurality of bracket connection points. The high lift assembly includes a plurality of high lift connection points, each high lift connection point corresponding to a bracket connection point and being connected thereto by a connector. The bracket includes first and second flanges. The bracket connection points are located on the first and second flanges. The first and second flanges each include respective first and second landing surfaces configured to abut a connection assembly surface, the first landing surface being oriented perpendicular to the second landing surface.

15 Claims, 5 Drawing Sheets

WING FOR AN AIRCRAFT AND HIGH LIFT ASSEMBLY CONNECTION METHOD

CROSS-REFERENCES TO RELATED APPLICATIONS

This application claims the benefit of European Patent Application Number 24162379.2 filed on Mar. 8, 2024, the entire disclosure of which is incorporated herein by way of reference.

FIELD OF THE INVENTION

The present invention relates to a wing for an aircraft and a method of connecting a high lift assembly to the wing of an aircraft.

BACKGROUND OF THE INVENTION

The described wing for an aircraft comprises a main wing and a high lift assembly, the high lift assembly comprising a high lift body, a bracket and a connection assembly movably connecting the high lift body to the main wing such that the high lift body is movable between a retracted position and at least one extended position (e.g., movable relative to the main wing). To enable movement of the high lift body between the extended and retracted position, the high lift body comprises a slat track and a roller bearing that movably connects the high lift body to the main wing. The slat track may comprise a slat track axis extending along the length thereof, such that the slat track is movable along the slat track axis via the roller bearing. The high lift body may be or comprise a leading edge slat or a trailing edge flap of a wing for an aircraft.

The bracket connects (e.g., directly connects) the connection assembly to the main wing and comprises a plurality of bracket connection points for connecting the connection assembly (e.g., for connecting the connection structure of the connection assembly) to the main wing. The connection assembly of the high lift assembly comprises a plurality of high lift connection points, each high lift connection point corresponding to a connection point of the bracket. Each high lift connection point and corresponding bracket connection point are connected by a connector (e.g., an elongate connector).

Wings for aircraft generally have connection assemblies that movably connect a high lift body to the main wing, for example so as to allow the high lift body to move between the extended and retracted position. The connection assembly in the wing of an aircraft may be supported by the wing box of the aircraft and connected to the wing box via an interface. The wing box provides structural support to the wing of the aircraft, and often comprises or defines a rib structure at the forward leading edge of the wing externally of the wing box itself, which may be used to carry leading edge devices such as slats, which may be operated and supported via a connection assembly.

The connection assembly may usually be assembled with the wing box of the wing for an aircraft. During assembly, the connection assembly is connected to the wing box via an interface that may be toleranced and configured so as to ensure a desired alignment of the wing box and the connection assembly. The alignment between the wing box and the connection assembly is important since this will also determine the orientation of the high lift body relative to the main wing. The installation of a connection assembly to the main wing is therefore a task which requires a high degree of precision. Installation of the connection assembly may be done during assembly of the wing box, meaning that the wing box and the connection assembly may be assembled together so as to set a desired orientation of the connection assembly relative to the wing box.

It is desirable to modularize the process of constructing an aircraft, for example to improve efficiency in the process of constructing the aircraft and/or to automate some steps involved in the construction of an aircraft. Modularization can also have the advantage that repair and replacement of parts is easier, as individual parts (e.g., modules) of the aircraft may be taken from the aircraft, and replaced with an identical module that does not need any replacement work, as well as permitting smaller modules to be assembled quickly and easily by a single worker, or a small number of workers. This would then allow the part that needs repair to be repaired on the ground without the rest of the aircraft also having to remain grounded with it, this greatly reducing the grounding times of the aircraft. However, in the case of the connection assembly, the high degree of precision required means that separating the construction of the wing box from the placement of the connection assembly into discreet steps would render sufficiently accurate placement of the connection assembly impossible, since it would have to be attached to a previously constructed wing box, with which there no longer existed the freedom to adjust the relative position of certain components thereof.

SUMMARY OF THE INVENTION

It is therefore an object of the invention to provide a wing assembly and a method for connecting a high lift assembly to the wing of an aircraft that is simple and may be carried out by relatively few personnel and that facilitates modular construction of the wing of an aircraft. It is further an object of the invention to permit such a simple and modular construction while being able to accurately orient the high lift assembly (and the connection assembly thereof) relative to the main wing.

This object of the invention is realized in that the described bracket comprises a first and a second flange, and the plurality of bracket connection points are located on (e.g., defined by) the first and second flange, and each of the first and second flanges comprise a respective first and second landing surface configured to abut a surface of the connection assembly, the first landing surface being oriented perpendicular (in some examples, substantially perpendicular or non-parallel) to the second landing surface.

Having perpendicularly oriented landing surfaces may assist to guide the connection assembly into an approximate position in which the connection assembly may be connected to the bracket. In addition, the forces acting on the connection assembly may be directed through the landing surfaces, and therefore through the flange, rather than all of the forces being directed through the connection points, and therefore the connection members located therebetween. Therefore, this configuration may provide a strong and robust connection and facilitate installing the connection assembly in a modular sequence.

The plurality of high lift connection points may be located in (e.g., may be defined by) the one of the first and second landing surfaces. The first landing surface may be oriented non-parallel (or possibly oblique) to the second landing surface.

The bracket connection points and the high lift connection points may be apertures defined in the first and second flanges, and connection assembly respectively, and the first and second widths are first and second diameters. The apertures may be circular, and each may comprise a central axis extending through the center thereof, and may be perpendicular to one of the first and second landing surfaces (e.g., perpendicular to the landing surface in which the connection point is located/defined) and/or parallel to the first and second flanges.

At least one of the plurality of connection points may be a master connection point having first width, and the remainder of the bracket connection points may be slave connection points having a second width, and wherein the high lift connection points each have a width equal to the first width. Having slave connection points having a different width than master connection points permits the high lift assembly to be attached to the main wing taking into account slight deviations in the location of the bracket and the high lift connection points arising as a result of tolerances during the construction of the main wing (e.g., the wing box of the main wing). For example, where the second width is greater than the first width, this may permit attachment of the corresponding connection point over a larger area, thus in the situation where a connection point is e.g., 1 mm offset from an expected location, a connection may still be able to be established. This may permit the main wing (e.g., the wing box of the main wing) to be preassembled before the high lift assembly is mounted thereto, thus assisting to modularize the process of the construction of a main wing.

In some examples, all the connection points (e.g., on the bracket) may be slave connection points (e.g., having a different width compared to the width of the high lift connection points). This may be acceptable in cases where the landing surfaces are oriented perpendicularly, since some of the force may be transmitted from the connection assembly to the bracket through contact between the landing surfaces, rather than through the connection points.

The first width may be smaller than the second width. Where the first and second widths are first and second diameters, then the first diameter may be smaller than the second diameter.

The bracket may comprise at least two master connection points. Each of the at least two master connection points may be located on either the first or the second flange. Alternatively, both of the at least two master connection points may be located on the first flange or the second flange (e.g., on the landing surface thereof). The master connection points may enable a user to secure the high lift assembly onto the bracket initially in a simple way, before connecting the remainder of the slave connection points to fully secure the high lift assembly relative to the bracket and therefore the main wing.

A third and a fourth flange may each comprise a respective third and fourth landing surface, wherein the third landing surface may be located in the same plane as the first landing surface, and the fourth landing surface may be located in the same plane as the second landing surface. The third landing surface may be parallel to the first landing surface, while the fourth landing surface may be parallel to the second landing surface.

The third flange may be identical to the first flange, and the fourth flange may be identical to the second flange, and the third and fourth flange may be laterally spaced from the first and second flange respectively, such that the connection assembly may be at least partially located therebetween. This may simplify construction by providing identical flanges, and ensure that the high lift assembly is adequately supported on either side thereof.

The connection assembly (e.g., the connection structure of the connection assembly) may comprise a first surface and a second surface, the plurality of high lift connection points being located in (e.g., defined by) the first and second surface. The high lift connection points located in the first surface may be configured to connect with the bracket connection points of the first flange. The high lift connection points located in the second surface may be configured to connect with the bracket connection points of the second flange.

A third aspect relates to a high lift assembly for the wing according to the preceding aspect. The high lift assembly comprises a high lift body comprising a high lift structure, a bracket comprising a plurality of high lift connection points, and a connection assembly. The high lift structure may be the structure of the high lift body, e.g., the form as a slat, flap or the like. The connection assembly comprises a slat track that is configurable to be mounted to the main wing via a roller bearing such that the slat track movably connects the high lift body to the main wing such that the high lift body is movable between a retracted position and at least one extended position, the connection assembly additionally comprises a plurality of high lift connection points, each high lift connection point corresponding to a connection point on the bracket, each high lift connection point and corresponding bracket connection point being connected by a connector. The bracket comprises a first and a second flange, wherein the plurality of bracket connection points are located on the first and second flange and each of the first and second flange comprise a respective first and second landing surface configured to abut a surface of the connection assembly, the first landing surface being oriented perpendicular to the second landing surface.

A third aspect relates to a method for connecting a high lift assembly to the wing of an aircraft according to the previous aspect. The method comprises preassembling the wing for an aircraft (e.g., the wing box of the wing for an aircraft), aligning the at least one bracket connection point (e.g., a master bracket connection point) on a first landing surface with a corresponding high lift connection point on the connection assembly, connecting the at least one aligned bracket connection point with the corresponding high lift connection points via a connector, subsequently connecting the remaining bracket connection points (e.g., the slave bracket connection points) with the corresponding high lift connection points via a connector.

The method may comprise contacting a surface of the connection assembly (e.g., an outer connection structure of the connection assembly) with both a first and second landing surface of the bracket before aligning the master bracket connection point with a corresponding high lift connection point.

An aspect relates to an aircraft comprising a wing according to the first aspect.

DETAILED DESCRIPTION OF THE PREFFERED EMBODIMENTS

Figure 1:
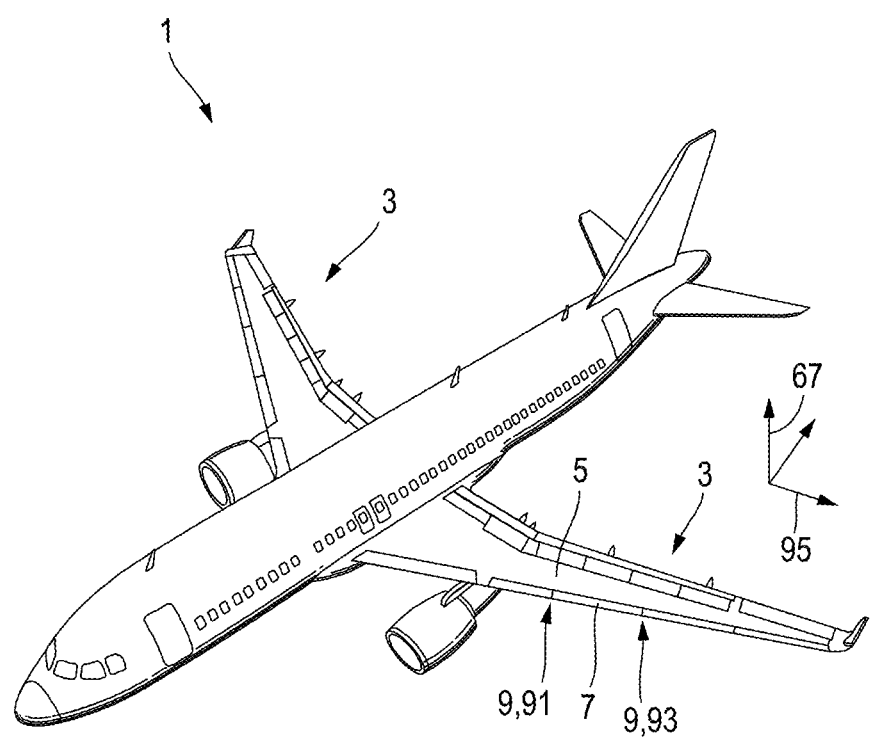
FIG. 1 is a perspective view of an aircraft, showing a wing of the aircraft.

In FIG. 1 an aircraft 1 according to an embodiment of the present invention is illustrated. The aircraft 1 comprises a wing 3 that is formed according to an embodiment of the present invention.

As shown in FIG. 1, the connection assembly 9 relates to a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91. Additionally illustrated in FIG. 1 is a wing thickness direction 67. While, in FIG. 1, the connection assembly 9 is illustrated as connecting slat 7 to the main wing 5, it should also be understood that the connection assembly 9 may be used to connect a trailing edge flap 2 to the wing 5 of an aircraft.

Figure 2:
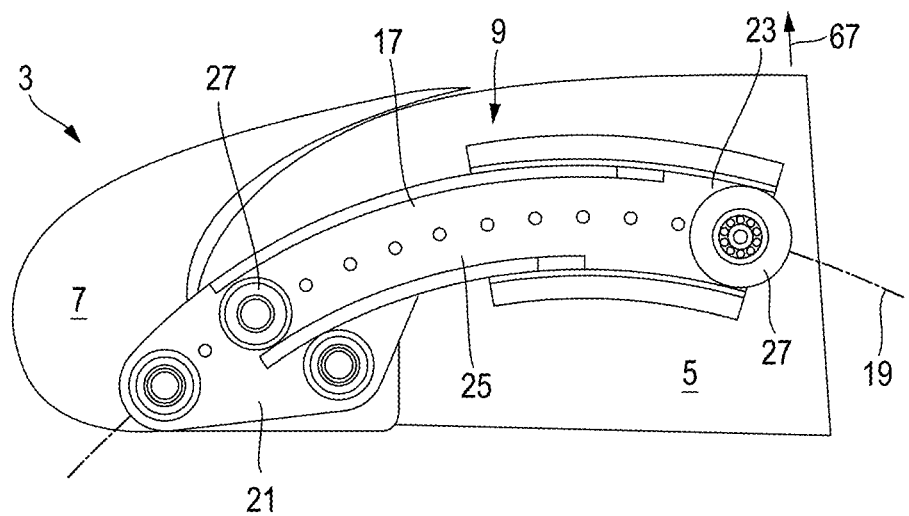
FIG. 2 is a schematic view of a connection assembly in an aircraft.

FIG. 2 shows an example of a connection assembly 9 of a wing for an aircraft, which is configured to connect a slat to the main wing of an aircraft. The connection assembly 9 may be used in combination with a wing 1 similar to that as described in FIG. 1, where the wing 1 comprises a main wing 5, a slat 7, and a connection assembly 9 (according to the present disclosure) movably connecting the slat 7 to the main wing 5, such that the slat 7 is movable between a retracted position and at least one extended position.

In FIG. 2, the connection assembly 9 comprises a slat track 17 that extends along a track longitudinal axis 19 between a front end 21 and a rear end 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19.

Figure 3:
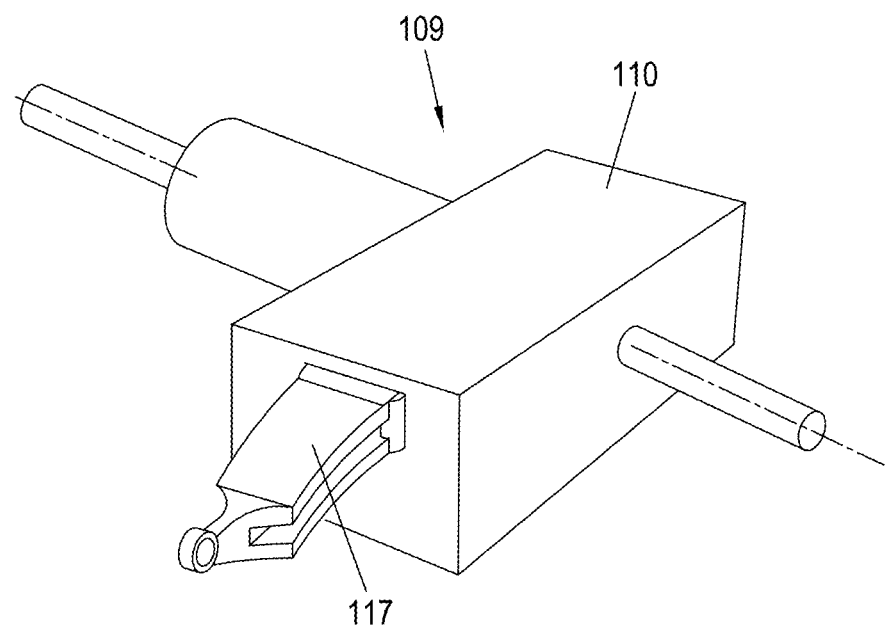
FIG. 3 is a schematic view of a connection assembly cassette.

An alternative connection assembly 109 is illustrated in FIG. 3, this time in the form of a connection assembly cassette. Here, the slat track 117 is partially located inside a cassette housing 110, and the roller bearing on which the slat track 117 is located completely in the housing 110. In order to move the slat track 117 between an extended and a retracted position, an actuator or actuators are provided that penetrate the cassette housing 110 and permit movement of the slat track 117.

Figure 4A:
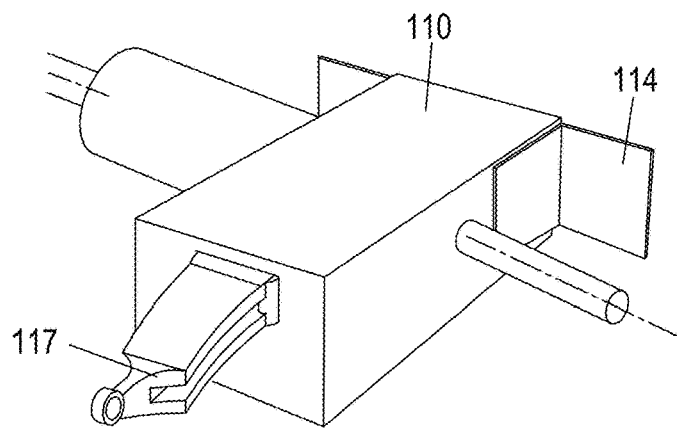
FIGS. 4A-C provide views of a connection assembly cassette mounted to an aircraft wing.
Figure 4B:
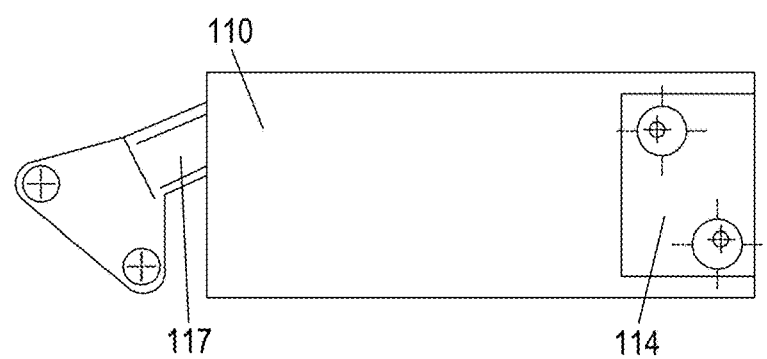
Figure 4C:
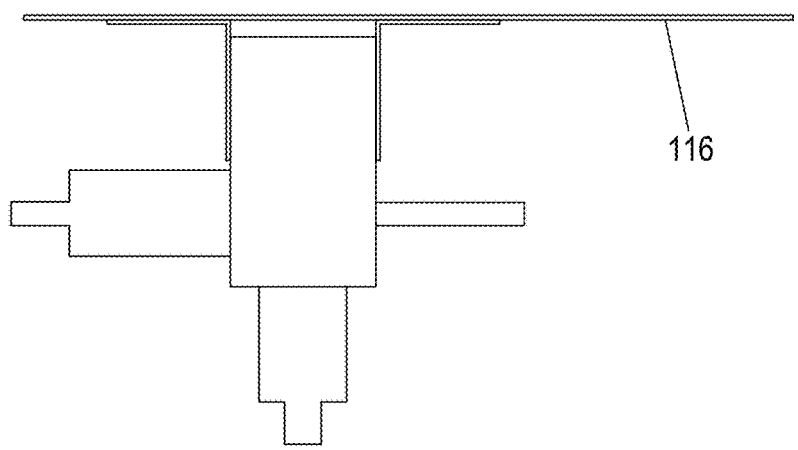

In both the case of the connection assembly 9, 109 having an "open" construction as shown in FIG. 2, or a "cassette" construction as is shown in FIG. 3, the connection assembly may be mounted to the main wing of an aircraft via a mounting arrangement. One example of a mounting arrangement 114 is illustrated in FIG. 4A. Here, a cassette housing 110 is mounted to a main wing 116 of an aircraft via the mounting arrangement 114. The mounting arrangement 114 is in the form of a bracket, which comprises a number of locations at which the bracket is connected to the cassette 110, for example via a known connector. In this example, the main wing 116 (and, in particular, the wing box of the main wing) has been constructed at the same time as the cassette 110 was mounted thereon. This has the effect of permitting the orientation of the cassette 110 relative to the main wing 116 to be adapted such that the slat track 117 is at the desired angle relative to the main wing 116. The exact orientation required by the connection assembly 9, 109 relative to the main wing may change slightly depending on the exact connection assembly 9, 109, for example due to manufacturing tolerances during the production of the aircraft wing, the main wing (including the wing box) and/or the connection assembly itself. Therefore, at present it is important to ensure that the connection assembly 9, 109 is adequately oriented relative to the main wing 116 during production thereof.

While the desire to modularize the production of an aircraft provides advantages in terms of more efficient production, as well as improved processes for the repair and replacement of aircraft parts, it has the effect that the already assembled (e.g., preassembled) parts are not able to be adjusted to account for slight anomalies in the dimensions of parts (e.g., of a connection assembly) so as to accurately orient those parts relative to the preassembled structure.

Figure 5:
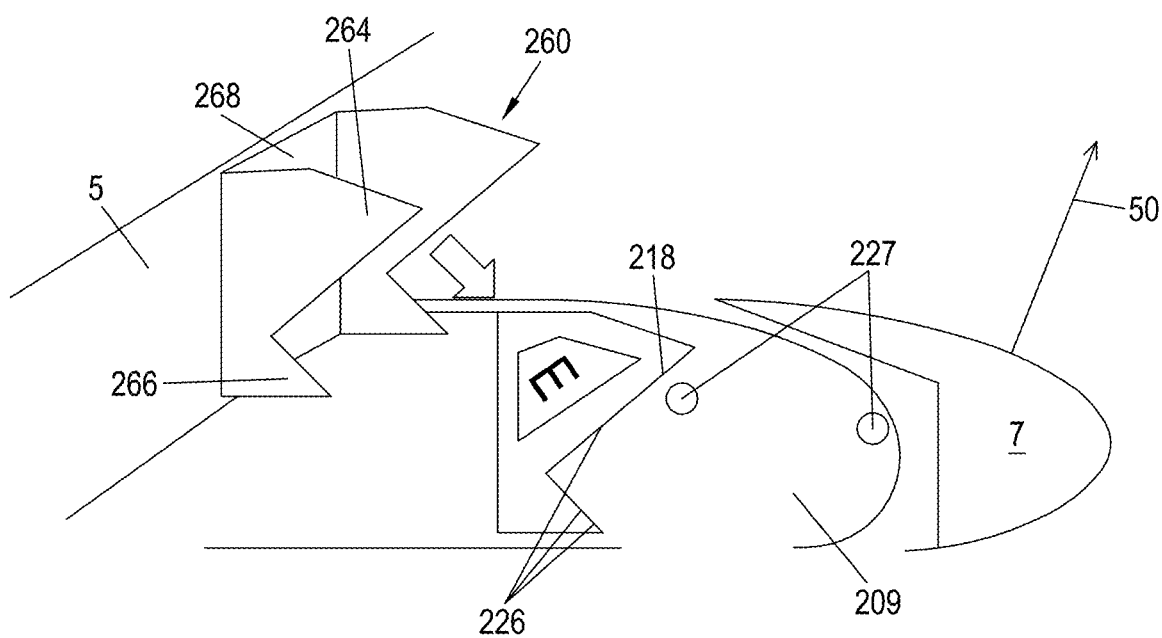
FIG. 5 schematically illustrates a bracket and connected high lift assembly.

FIG. 5 schematically illustrates a connection assembly 209, which in this case is schematically illustrated by showing rollers of a roller bearing 227 thereof, as well as a high lift body 7 which may be supported by a roller bearing as described previously. In addition, an arrow 50 illustrating the direction of a possible force incident on the high lift body is shown in FIG. 5.

Here, a connection structure 218 of the connection assembly is schematically illustrated by an outline thereof. The connection structure 218 is connected to a bracket 260 via a plurality of connections 262. The bracket 260 comprises a first and second flange 264, 266, as well as a third and fourth flange 284, 286, where the third and fourth flanges 284, 286 are laterally offset (e.g., in the wing span direction) relative to the first and second flanges 264, 266 and connected by an intermediate member 268 located therebetween, and in this example oriented perpendicular to each flange 264, 266, 284, 286. In the following description, the connection between the first and second flanges 264, 266 and the high lift assembly will principally be described for simplicity. However, it should be noted that the third and fourth flanges 284, 286 also comprise connection points for connection to connection points on the connection structure 218 of the connection assembly, analogous to the first and second flanges 264, 266. The first and second flanges 264, 266 may therefore allow connection to a first side of the connection assembly, while the third and fourth flanges 284, 286 may permit connection to a second, opposite side of the connection assembly.

Figure 6:
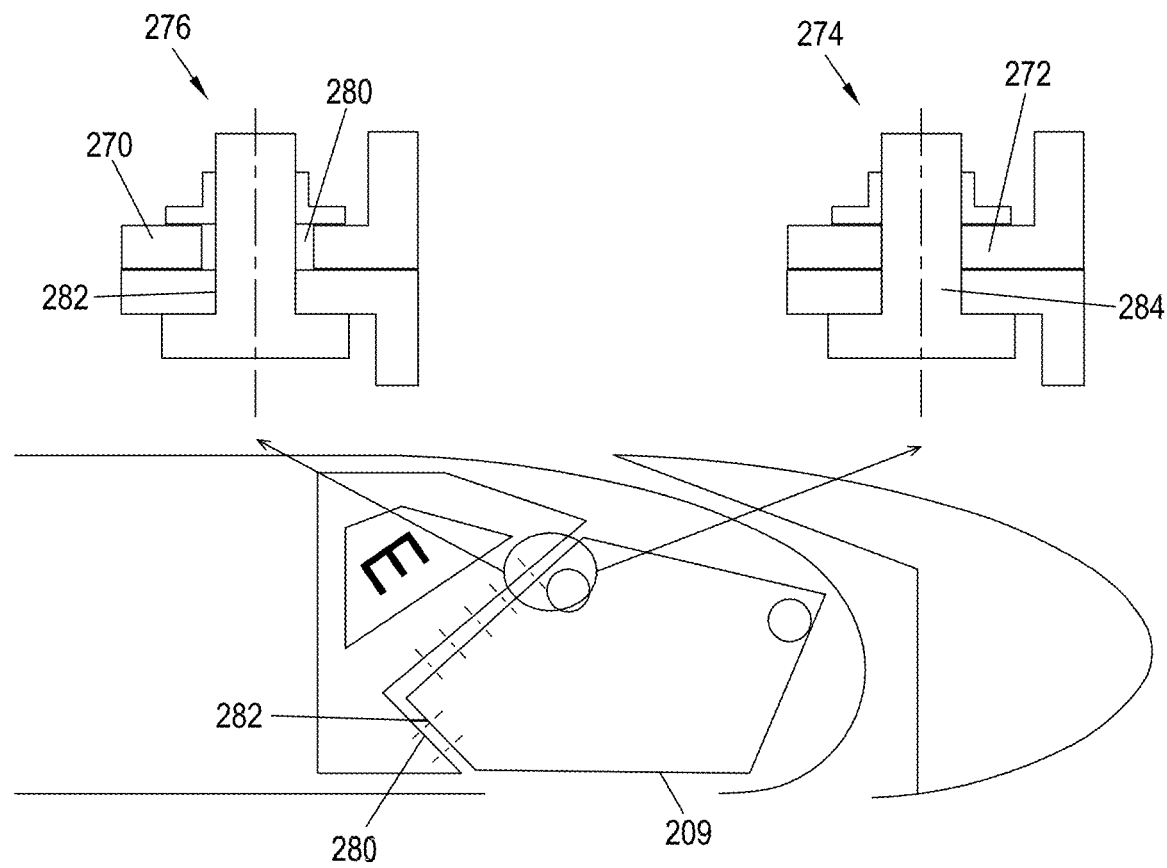
FIG. 6 provides further detail of the connection between the bracket and the high lift assembly.

Each of the bracket 260 and the connection structure 218 comprises a plurality of connection points 280, 282 located thereon. In particular, the plurality of connection points are located on, and may be defined by, the first and second flanges 264, 266. Each of the first and second flanges may comprise a landing surface 270, 272, which may be located perpendicular to the first and second flanges 264, 266 (e.g., extending in the span-wise direction of the wing), and/or which may be located parallel to a surface of the connection structure 218 to be connected to the first and second flanges 264, 266. The landing surfaces 270, 272 may provide a surface which abuts the connection structure 218 of the connection assembly 209 in order to facilitate placement of the connection assembly 209 relative to the bracket 260. As illustrated in FIG. 5 and FIG. 6, the landing surfaces 270, 272 are perpendicular to one another when viewed in a span-wise direction, such that the connection structure 218 may be guided towards an approximate installation position by the first and second flanges 264, 266. In such examples, the connection structure may comprise a profile that is configured to engage with the landing surfaces 270, 272. For example, the connection structure 218 may comprise a first surface and a second surface that are configured to abut the landing surfaces 270, 272 of the first and second flanges. The first and second surfaces may therefore have the same orientation as the landing surfaces 270, 272, e.g., they may be oriented at right-angles, or approximately right-angles. The first and second surfaces of the connection structure 218 may be located at one side thereof, and in the case where the connection structure 218 is in the form of a cassette (see FIG. 3, for example), the first and second surface of the connection structure 218 may be obliquely oriented relative to the main body of the cassette, which may be located in line with the orientation of the wing (e.g., having upper and lower surfaces parallel to the upper and lower surfaces of the wing).

FIG. 6 illustrates the connection between the first and second flanges 264, 266 and the connection structure 218 of the connection assembly in more detail. Here, a "slave connection point" 276 and a "master connection point" 274 are illustrated in the cross sections of the connection illustrated in the upper half of FIG. 6. It can be seen that the connection points in the connection structure are in the form of a circular aperture that is defined in the outer connection structure 218 thereof, while in the case of the first and second flanges 264, 266, the connection points are in the form of a circular aperture defined in the landing surface thereof. At least one of the connection points on the bracket 260 may be a master connection point, while the remainder may be slave connection points. In practice, multiple master connection points may be present on the bracket 260, for example two or three may be located on (e.g., divided between) the first and second flanges. Alternatively, all of the master connection points may be located on one flange, e.g., either the first or second flange 264, 266, meaning that a majority of the force transmitted from the high lift assembly to the main wing may be transmitted through this flange. In some cases, all the master connection points may be located on one flange of any of the first to fourth flanges 264, 266, 284, 286.

In the case of a master connection point, the connection point of the bracket 260 may have a predetermined width. This width may be considered to be a "first width" and may be equal (e.g., substantially equal) to the width of the connection point on the connection structure 218. In the case of a slave connection point, the connection point of the bracket may have a predetermined width, that is a second width, and that is larger than the first width. In this case, since the connection points are in the form of a circular aperture, the first width may be a first diameter, and the second width may be a second diameter.

In use, the connection structure 218 may be guided by the landing surfaces 270, 272 into an approximate position for connection with the bracket 260. The connection points of the connection structure 282 may then be aligned with the connection points of the bracket 260 for connection with a connector 285 therebetween. The connector 285 may be an elongate connector such as a bolt, screw, or the like, and may be fastened at one end by a nut. The master connection points 274 may first be connected to a corresponding connection structure connection point 282, and then the slave connection points 276 may be connected to a corresponding connection point 282 of the connection structure 218. Since the slave connection points 276 have a larger diameter, they may be more resistant to slight deviations in the location of the connection points on the bracket and/or the connection structure 218 due to tolerances during construction of the components. Therefore, the connection assembly 209 and the high lift assembly may still be able to be connected to the main wing, even where the alignment of the connection points 280, 282 is not exactly as expected. This may be a particular advantage in the case where the main wing, or the wing box of the main wing, has been preassembled before the high lift assembly is connected thereto, since once the main wing (e.g., the wing box) has been preassembled, small inaccuracies due to tolerances may be more difficult to correct. Therefore, the present design of bracket 260 and connection assembly permits more flexible attachment therebetween, and facilitates modular construction of the wing of an aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a main wing;
a high lift assembly comprising:
a high lift body comprising a high lift structure;
a bracket; and
a connection assembly comprising a slat track and a roller bearing that movably connects the high lift body to the main wing, such that the high lift body is movable between a retracted position and at least one extended position;
the bracket connecting the connection assembly to the main wing and comprising a plurality of bracket connection points for connecting the connection assembly to the main wing, the connection assembly of the high lift assembly comprising a plurality of high lift connection points, each bracket connection point of the plurality of bracket connection points corresponding to a high lift connection point of the plurality of high lift connection points;
wherein each bracket connection point of the plurality of bracket connection points and corresponding high lift connection point of the plurality of high lift connection points are connected by a connector; and
wherein the bracket comprises a first and a second flanges, wherein the plurality of bracket connection points are located on the first and second flanges and each of the first and second flanges comprise a respective first and second landing surfaces configured to abut surfaces of the connection assembly,
wherein the first landing surface is oriented perpendicular to the second landing surface.

2. The wing for an aircraft according to claim 1, wherein the plurality of bracket connection points are located in both of the first and second landing surfaces.

3. The wing for an aircraft according to claim 1, wherein the first and second landing surfaces are relatively oriented such that one of the first and second landing surfaces is located lower than the other of the first and second landing surfaces.

4. The wing for an aircraft according to claim 1, wherein the first and second landing surfaces are located obliquely relative to a thickness direction of the wing.

5. The wing for an aircraft according to claim 1, wherein the plurality of bracket connection points and the plurality of high lift connection points are apertures defined in the flanges, and the connection assembly, respectively, and the apertures have first and second diameters with the first and second widths, respectively.

6. The wing for an aircraft according to claim 1,
wherein at least one of the plurality of bracket connection points comprises a master connection point having a first width, and a remainder of the plurality of bracket connection points are slave connection points having a second width, and
wherein the plurality of high lift connection points each have a width equal to the first width.

7. The wing for an aircraft according to claim 6, wherein the first width is smaller than the second width.

8. The wing for an aircraft according to claim 6, wherein the bracket comprises at least two of the master connection points, and the at least two of the master connection points are located on either the first or the second flange.

9. The wing according to claim 1, comprising a third and a fourth flanges each comprising, respectively, a third landing surface and a fourth landing surface, wherein the third landing surface is located in a same plane as the first landing surface, and the fourth landing surface is located in a same plane as the second landing surface.

10. The wing according to claim 9, wherein the third flange is identical to the first flange, and the fourth flange is identical to the second flange, and the third and fourth flanges are laterally spaced from the first and second flanges respectively, such that the connection assembly may be at least partially located therebetween.

11. The wing according to claim 1,
wherein the connection assembly comprises a first surface and a second surface, the plurality of high lift connection points being-located in the first and second surfaces,
wherein high lift connection points of the plurality of high lift connection points located in the first surface are configured to connect with bracket connection points of the plurality of bracket connection points of the first flange, and
wherein high lift connection points of the plurality of high lift connection points located in the second surface are configured to connect with bracket connection points of the plurality of bracket connection points of the second flange.

12. A high lift assembly for a main wing of an aircraft, comprising:
a high lift body comprising a high lift structure;
a bracket; and
a connection assembly comprising a slat track that is configurable to be mounted to the main wing via a roller bearing such that the slat track movably connects the high lift body to the main wing such that the high lift body is movable between a retracted position and at least one extended position, the connection assembly comprising a plurality of high lift connection points, each bracket connection point of a plurality of bracket connection points corresponding to a high lift connection point of the plurality of high lift connection points, each bracket connection point of the plurality of bracket connection points and corresponding high lift connection point of the plurality of high lift connection points connected by a connector;
wherein the bracket comprises a first and a second flanges, and
wherein the plurality of bracket connection points are located on the first and second flanges and each of the first and second flange comprise a respective first and second landing surfaces configured to abut surfaces of the connection assembly,
wherein the first landing surface is oriented perpendicular to the second landing surface.

13. A method for connecting a high lift assembly to a main wing of an aircraft, the method comprising:
preassembling the main wing of the aircraft;
providing a bracket and a connection assembly comprising a slat track and a roller bearing that moveably connects a high lift body to the main wing, such that the high lift body is movable between a retracted position and at least one extended position, the bracket comprising a plurality of bracket connection points for connecting the connection assembly to the main wing, the connection assembly of the high lift assembly comprising a plurality of high lift connection points, each bracket connection point of the plurality of bracket connection points corresponding to a high lift connection point of the plurality of high lift connection points, and wherein the bracket comprises a first and a second flanges, wherein the plurality of bracket connection points are located on the first and second flanges and each of the first and second flanges comprise a respective first and second landing surfaces configured to abut surfaces of the connection assembly, wherein the first landing surface is oriented perpendicular to the second landing surface,
aligning at least one bracket connection point of the plurality of bracket connection points with a corresponding high lift connection point of the plurality of high lift connection points;
connecting the at least one aligned bracket connection point with the corresponding high lift connection points via a connector; and
subsequently connecting any remaining bracket connection points of the plurality of bracket connection points with corresponding high lift connection points of the plurality of high lift connection points via connectors.

14. The method according to claim 13, further comprising:
contacting the surfaces of the connection assembly with the first and second landing surfaces of the bracket before aligning the at least one bracket connection point with the corresponding high lift connection point.

15. An aircraft comprising the wing according to claim 1.

* * * * *